United States Patent Office 2,724,698
Patented Nov. 22, 1955

2,724,698
LUBRICATING OIL ANTI-FOAMING AGENT

Allen R. Kittleson, Cranford, N. J., assignor to Esso Research and Engineering Company, a corporation of Delaware No Drawing. Application December 1, 1950,
Serial No. 198,759

4 Claims. (Cl. 252—49.6)

The present invention relates to foam-inhibitors for oil compositions and particularly to petroleum base oils, especially lubricating oils and the like which, while having a normal tendency to foam under conditions of agitation, are substantially inhibited against such foaming by the presence of active foam modifying agents.

As is well known in the art, the foaming of lubricating oils, hydraulic fluids and the like, and even of less viscous materials, such as fuel oils of various types sometimes cause operating difficulties. Certain mechanisms are lubricated by force pumps which do not operate properly if substantial proportions of foam are present. Hydraulic mechanisms, fuel pumps and the like may be similarly affected. Furthermore, the presence of large quantities of foam at any point in a mechanical system may interfere with proper operation of that system, or may result in excessive loss of the foaming oil. The foaming and frothing may result in inadequate supply of the oil at the point of use or it may result in the pumping of air instead of oil with obvious failure in proper functioning.

The prior art has suggested that various materials such as, long chain aliphatic alcohols, silicone type materials, and other agents having certain degrees of solubility or insolubility, and of surface activity, may have use in inhibiting or reducing foaming. Some of these materials, such as the dimethyl silicones, are potent foam inhibitors but are objectionable oil additions in certain respects and for certain uses.

As is also well known in the prior art, numerous oil compositions, particularly the lubricating oils but including also hydraulic fluids, fuel oils and other materials, commonly contain minor proportions of detergent materials, organic esters, etc., of various types. These materials frequently tend to promote foaming and this tendency must be offset.

The problem appears of primary importance in the hydrocarbon or mineral oils of higher viscosity than gasoline, but it is not limited thereto. It applies also to various non-hydrocarbon liquids, such as ester type lubricating oils, polyglycols and the like and also to non-hydrocarbon hydraulic fluids and other oily compositions.

According to the present invention, it has been discovered that certain organic materials including silicon which apparently have not been known to the prior art, at least for such purposes, are effective foam reducing or inhibiting agents and at the same time are not objectionable as additives to the oils. In these compositions, according to the present invention, the proportion of silicon is materially lower than in prior art silicone type foam inhibitors. This appears to be quite advantageous since silicon and its compounds, in general, usually are not desirable agents in oils, especially mineral lubricating oils.

The present invention contemplates the use of the reaction products of polyhydric alcohols and diamino silanes, for example, the reaction products of glycol and diamino-dialkoxy silanes prepared according to the following general formula:

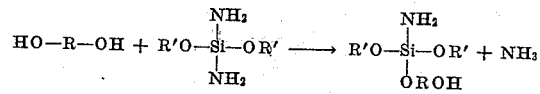

In these formulas, R and R' may be alike or different. In general R can be an alkyl group $(CH_2)_n$, where $n$ is a small integer, preferably not less than 2 nor greater than 6, or R may be a phenyl, diphenyl or analogous substituted aryl group such as $-C_6H_4-$, $C_6H_4R''C_6H_4$, where $R''$ is $CH_2-$, $C(CH_3)_2-$, etc. Thus R may be a group such as

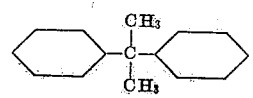

Preferably the groups R and R' are both lower alkyl residual groups, alike or different, such as ethyl, propyl or butyl, R' may be methyl in some cases.

Reactions of the type given above proceed at ordinary temperatures, usually with some vigor when the organic substituents are not of excessive molecular weight. In general the polyhydric (preferably dihydric) alcohol should not contain more than about 6 carbon atoms and the hydrocarbon substituents in the alkoxy silanes should be similarly limited to about 6 carbon atoms.

From the foregoing it will be understood that the foam inhibitor per se is a condensation product of a polyhydric alcohol, such as a glycol, glycol ether, pentaerythritol, sorbitol or sorbitan, related hexitols or hexitans, glycerol, etc., with a dialkoxy diamino silane. The polyhydric alcohol is preferably dihydric (glycol) especially ethylene glycol and the preferred silane is a lower alkoxy diamino silane, having not more than 6 carbon atoms, preferably about 4. The isobutoxy diamino silane is particularly suitable, giving a product which appears to have about optimum properties.

The exact nature of the reaction which occurs is not completely understood, but it is believed that in general, the amino groups on the diamino dialkoxy silanes are replaced by the alcohol groups. Where dihydric alcohols are used, such as ethylene glycol and other lower glycols such as propylene glycol, butylene glycol, etc., 2 ore more molecules of the silane may be connected together to form a polymer according to the general formula:

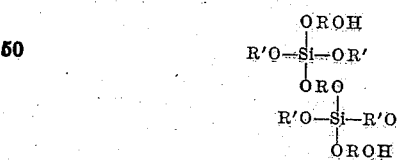

It is obvious the degree of polymerization will depend upon the proportion of reactants as well as upon the presence of conditions favoring polymerization. In general, however, several molecules of the silane may be expected to be linked together according to the formula:

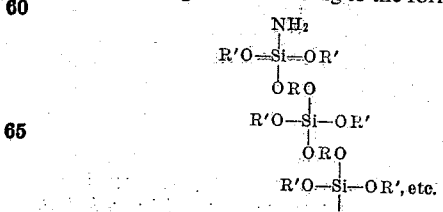

In this formula one of the amino groups is shown still attached, and experimental data indicate that a small amount of nitrogen may remain in the polymerization product, although most of it is displaced. Residual NH$_2$- groups may be further displaced if desired by reacting with other groups such as monohydric alcohols, halogens, etc. In general the resulting formula has the basic structure

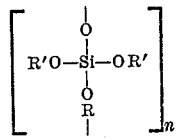

unsaturated valences being satisfied by additional similar groups or, in the case of terminal valences, by —H, —R, or —ROH. As previously indicated, terminal valences may be saturated by residual NH$_2$- groups or halogens, etc., chlorine being the most suitable of the halogens with bromine second choice. The subscript $n$ may have a value from as low as 2 to about 50. Preferably it averages between 5 and 25.

The condensation product of ethylene glycol and diamino dibutoxy silane is a particularly satisfactory foam inhibitor for use in hydrocarbon oils. It is not soluble in such oils to a measurable degree, which appears to be one of the requirements for an effective foam inhibitor. Using substantially equimolar proportions of reactants, the condensation reaction apparently proceeds according to the equation

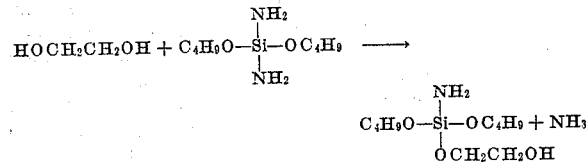

other groups being added to form chain-type polymers with some cross-linking according to the general formula

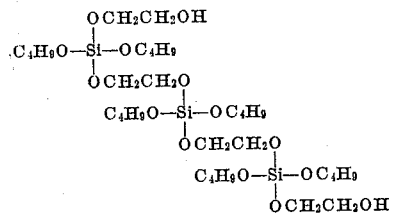

The following example and data will illustrate the invention more fully.

EXAMPLE 31 g. of anhydrous ethylene glycol was added to 115 g. of di-t-butoxy diamino silane in a 500 cc. flask. After a few minutes an almost explosive reaction occurred with rapid evolution of ammonia. After the reaction had subsided (10–15 min.) a viscous clear oil and some waxy solid had formed. The oil (F$_1$) (50 g.) was filtered off and a portion (F$_2$) of it was heated to 80–90° C. for about six hours. Analysis of the two oil samples showed 4.44% nitrogen for F$_1$ and 1.78% nitrogen for F$_2$.

The antifoamant activity of these products was tested in an SAE 30 oil containing 5% of a detergent foam promoting additive in the following manner:

A small quantity of the reaction product was dispersed in the compounded lubricating oil by vigorous stirring for about 10 minutes. 390 cc. of the oil blend was then charged to a 1000 cc. graduated cylinder and air bubbled through the oil, using a diffuser stone, at the rate of 143–5 cc. per minute for 5 minutes. The volume of foam was recorded immediately (foam tendency) and again 10 minutes after the air flow was stopped (foam stability). The test was carried out at a temperature of 75 to 80° F. (this is a modification of the Standard ASTM-D 892-46-T foam test).

The antifoamant activity of the products described herein is shown in the following table.

*Antifoamant activity of ethylene glycol-amino silane condensation products in SAE 30 lubricating oil containing 5% detergent additive*

| Fraction | Wt. percent of Polymer in Oil | cc. of Foam | |
|---|---|---|---|
| | | Foam Tendency | Foam Stability |
| F$_1$ | 0.1 | 0 | 0 |
| | 0.01 | 0 | 0 |
| F$_2$ | 0.1 | 0 | 0 |
| | 0.01 | 0 | 0 |
| | 0.001 | 400 | 30 |
| | None | 1,060 | 860 |

The proportions of antifoamant required will vary with the degree of foam inhibition required and also with the constituents of the oil to be inhibited. Oils having a strong tendency to foam may require as much as 0.1% by weight, based on the total composition and even up to 1%. On the other hand, oils having a less pronounced tendency may be effectively inhibited with much less of the additive as little as 0.0001% by weight of the silicon-containing polymer, based on the weight of the total composition, being effective in some cases.

In general, the useful range of the foam inhibitor appears to run from about 0.0001 to about 1% by weight. The preferred range for most oil compositions lies between 0.001 and 0.1%. As indicated above the condensation product of ethylene glycol and diamino dibutoxy silane (between 0 and 100° C.) is a potent foam inhibitor in proportions of 0.001%, even in oils containing as much as 5% of a detergent additive which is strongly foam-promoting.

Foam activity may be determined by stirring or beating the oil vigorously with a standard household type mixer or beater, measuring the amount of foam produced after a given period of time at the temperature for which test data are required. However the standard ASTM method is preferred where foaming is caused by bubbling air through the oil at a controlled rate, measuring the volume of foam produced after a given time and at the chosen temperature. Foam stability is measured, as is well known in the art, by measuring the amount of foam remaining after a given period of time during which the oil has not been agitated.

It will be understood that while the present invention is applicable particularly to lubricating oils, and especially to mineral base lubricating oils containing active detergents, it is equally applicable to various other oils and related organic materials, provided the modifier is substantially insoluble in such materials. The invention contemplates the use of this foam inhibitor in oils of various degrees of viscosity and even in oils which, although liquid under conditions of use, may solidify under some other conditions.

What is claimed is:

1. A liquid oil composition having a normal tendency to foam under conditions of agitation and containing a minor proportion, sufficient to reduce said tendency substantially, of a substantially oil-insoluble stably dispersed nitrogen-containing polymeric condensation product of viscous oil consistency obtained by mixing substantially equimolar proportions of di-t-butoxydiamino silane and ethylene glycol at ordinary temperatures until a spontaneous reaction and NH$_3$ evolution takes place and until said evolution substantially ceases.

2. A liquid oil composition according to claim 1 containing 0.0001 to 1.0 weight per cent based on the weight of the total composition of said condensation product.

3. A liquid oil composition according to claim 1 wherein said oil is a mineral base hydrocarbon oil.

4. A lubricating oil composition comprising a major proportion of an organic oil of lubricating grade and viscosity having a tendency to foam under conditions of agitation and an amount of 0.0001 to 1.0% by weight based on the weight of the total composition of a substantially oil-insoluble stably dispersed polymeric condensation product of viscous-oil consistency substantially insoluble in said oil and obtained by mixing substantially equimolar proportions of di-t-butoxydiamino silane and ethylene glycol at ordinary temperatures until a spontaneous reaction and $NH_3$ evolution takes place and until said evolution substantially ceases and thereafter heating said mixture to a temperature of about 80° to 90° C. for about 6 hours.

References Cited in the file of this patent

UNITED STATES PATENTS

| | | |
|---|---|---|
| Re. 23,274 | Morrill | Sept. 26, 1950 |
| 2,416,503 | Trautman et al. | Feb. 25, 1947 |
| 2,435,124 | Bollinger | Jan. 27, 1948 |
| 2,490,691 | Langkammerer | Dec. 6, 1949 |
| 2,507,422 | Rust et al. | May 9, 1950 |
| 2,566,365 | Pedlow et al. | Sept. 14, 1951 |

OTHER REFERENCES

Miner: "Tert-Alkoxyaminosilanes," Ind. & Eng. Chem., vol. 39, No. 11, November 1947, pages 1368–1371.